(12) United States Patent
Suzue et al.

(10) Patent No.: US 10,547,075 B2
(45) Date of Patent: Jan. 28, 2020

(54) ELECTRODE CATALYST LAYER FOR FUEL CELL

(71) Applicant: NISSAN MOTOR CO., LTD., Yokohama-shi, Kanagawa (JP)

(72) Inventors: Yoshinori Suzue, Machida (JP); Yoshitaka Ono, Yokohama (JP); Hiroshi Iden, Neyagawa (JP); Atsushi Ohma, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 664 days.

(21) Appl. No.: 14/358,498

(22) PCT Filed: Nov. 1, 2012

(86) PCT No.: PCT/JP2012/078365
§ 371 (c)(1),
(2) Date: May 15, 2014

(87) PCT Pub. No.: WO2013/073383
PCT Pub. Date: May 23, 2013

(65) Prior Publication Data
US 2014/0287344 A1  Sep. 25, 2014

(30) Foreign Application Priority Data

Nov. 17, 2011  (JP) .................. 2011-251858

(51) Int. Cl.
*H01M 8/10* (2016.01)
*H01M 8/1004* (2016.01)
(Continued)

(52) U.S. Cl.
CPC ............ *H01M 8/1004* (2013.01); *H01M 4/86* (2013.01); *H01M 4/9075* (2013.01); *H01M 4/926* (2013.01); *H01M 2008/1095* (2013.01)

(58) Field of Classification Search
CPC ...... H01M 4/86; H01M 4/9075; H01M 4/926; H01M 8/1004; H01M 2008/1095
See application file for complete search history.

(56) References Cited

U.S. PATENT DOCUMENTS 4,552,631 A * 11/1985 Bissot .................... C08J 5/2281
                                                        204/252
2002/0009626 A1* 1/2002 Terazono ................. B01J 23/42
                                                        429/482
(Continued)

FOREIGN PATENT DOCUMENTS

EP        1 808 226 A1    7/2007
JP     2005-026174 A     1/2005
(Continued)

OTHER PUBLICATIONS

Subbaraman, Ram, et al. "Oxygen Reduction Reaction at Three-Phase Interfaces." ChemPhysChem 11.13 (2010): 2825-2833. (Year: 2010).*

(Continued)

*Primary Examiner* — Milton I Cano
*Assistant Examiner* — Philip A. Stuckey
(74) *Attorney, Agent, or Firm* — Foley & Lardner LLP

(57) ABSTRACT

To provide a catalyst layer for a fuel cell, which exhibits excellent power generation performance even in the case of reducing the used amount of a catalyst. It is an electrode catalyst layer for a fuel cell comprising a catalyst, a porous carrier for supporting the above-mentioned catalyst, and a polymer electrolyte, in which a mode diameter of the pore distribution of the above-mentioned porous carrier is 4 to 20 nm, and the above-mentioned catalyst is supported in a pore with a pore diameter of 4 to 20 nm of the above-mentioned porous carrier.

11 Claims, 6 Drawing Sheets

(51) Int. Cl.
    *H01M 8/1018* (2016.01)
    *H01M 4/90* (2006.01)
    *H01M 4/86* (2006.01)
    *H01M 4/92* (2006.01)

(56) References Cited

U.S. PATENT DOCUMENTS

| | | | |
|---|---|---|---|
| 2006/0093893 A1* | 5/2006 | Matsuo | H01M 4/881 429/483 |
| 2007/0116625 A1* | 5/2007 | Joo | B01J 21/18 423/445 R |
| 2007/0196659 A1 | 8/2007 | Setoyama et al. | |
| 2010/0092830 A1 | 4/2010 | Hayashi et al. | |
| 2013/0071771 A1* | 3/2013 | Vincent | H01M 4/8605 429/487 |

FOREIGN PATENT DOCUMENTS

| | | | |
|---|---|---|---|
| JP | 2005026174 A * | 1/2005 | |
| JP | 2008-186798 A | 8/2008 | |
| WO | WO 2008/093731 A1 | 8/2008 | |
| WO | WO-2011128549 A1 * | 10/2011 | H01M 4/8605 |

OTHER PUBLICATIONS

English translation of JP-2005026174-A (Year: 2005).*
Ohma, Atsushi, et al. "Analysis of proton exchange membrane fuel cell catalyst layers for reduction of platinum loading at Nissan." Electrochimica Acta 56.28 (2011): 10832-10841. (Year: 2011).*
Ignaszak, Anna, Siyu Ye, and Elöd Gyenge. "A study of the catalytic interface for O2 electroreduction on Pt: The interaction between carbon support meso/microstructure and ionomer (Nafion) distribution." The Journal of Physical Chemistry C 113.1 (2008): 298-307. (Year: 2008).*
European Extended Search Report, dated Nov. 11, 2014, 6 pages.

* cited by examiner

PRIOR ART

PRIOR ART

ELECTRODE CATALYST LAYER FOR FUEL CELL

TECHNICAL FIELD

The present invention relates to a catalyst layer for a fuel cell, and to a catalyst layer for a fuel cell in further detail, which improves power generation performance of the fuel cell.

BACKGROUND TECHNOLOGY

In recent years, a fuel cell has been noticed as a vehicle drive source and a stationary power source in response to social need and trend against the background of energy and environmental problems. The fuel cell is classified into various types in accordance with kinds of electrolytes and kinds of electrodes, and typical examples thereof include an alkali type, a phosphoric acid type, a molten carbonate type, a solid electrolyte type and a polymer electrolyte type. Among them, a polymer electrolyte fuel cell (PEFC) operatable at a low temperature (ordinarily 100° C. or less) has been noticed; in recent years, the development and practical use thereof have been advanced as a low-pollution power source for automobiles.

Generally, the configuration of PEFC is a structure such that a membrane electrode assembly (MEA) is sandwiched between separators. Generally, MEA has a structure such that a gas diffusion layer, a cathode catalyst layer, a solid polymer electrolyte membrane, an anode catalyst layer and a gas diffusion layer are laminated.

The following electrochemical reaction proceeds in MEA. First, hydrogen contained in fuel gas supplied to the anode (fuel electrode) side is oxidized by the catalyst to become a proton and an electron. Next, the produced proton reaches the cathode (air electrode) catalyst layer through a polymer electrolyte contained in the anode catalyst layer and the solid polymer electrolyte membrane contacting with the anode catalyst layer. Also, the electron produced in the anode catalyst layer reaches the cathode catalyst layer through a conductive carrier composing the anode catalyst layer, the gas diffusion layer contacting with the opposite side of the anode catalyst layer to the solid polymer electrolyte membrane, a gas separator, and an external circuit. Then, the proton and the electron, which reached the cathode catalyst layer, react with oxygen contained in oxidizing gas supplied to the cathode catalyst layer to produce water. In the fuel cell, electricity may be taken out to the exterior through the above-mentioned electrochemical reaction.

A vehicle drive source and a stationary power source have been studied as the uses of PEFC, and durability over a long term is demanded for the application to these uses. Above all, in the case of being used as the vehicle drive source, it is demanded that cell characteristics be not deteriorated due to frequent operation stops.

In particular, in a catalyst comprising platinum (Pt) or platinum alloy, a carbon material such as carbon black for supporting the catalyst, and an electrode catalyst layer containing a proton conductive polymer electrolyte, corrosion of the carbon material and decomposition degradation of the polymer electrolyte are easily caused by the repetition of operation stops. Thus, gas diffusivity and drainage of the electrode are deteriorated, concentration overvoltage is increased, and a tendency to deteriorate cell characteristics is brought.

On the contrary, a method for improving corrosion resistance of the catalyst layer by using the carbon material as a carrier, such that heat treatment controls crystallinity of the carbon material and improves corrosion resistance thereof, is known. However, such heat treatment brings an improvement in durability, whereas a decrease in specific surface area of the carbon material and pore (primary pore) capacity is brought. Thus, in the catalyst layer using the heat-treated carbon carrier, the problem is that the surface area effective for a reaction is decreased and power generation efficiency is deteriorated.

Then, many attempts to intend compatibility between durability of the catalyst layer and power generation performance have been made. For example, in Patent Document 1, a method for controlling a pore in the electrode catalyst layer is disclosed. In this method, a pore capacity of 0.01 to 2.0 μm in the electrode catalyst layer is controlled to 3.8 μl/cm²/mg-Pt or more, and a pore capacity of 0.01 to 0.15 μm is controlled to 2.0 μl/cm²/mg-Pt or more. The pore of 0.01 to 0.15 μm is intended for mainly supplying fuel gas and oxidative gas, and the pore of 0.15 to 2.0 μm is intended for discharging water produced by power generation. It is conceived that the control of these pores allows both excellent durability and excellent power generation performance to be offered.

PRIOR ART DOCUMENTS

Patent Document

[Patent Document 1] Publication of Japanese Patent Application 2005-26174

SUMMARY

The pore of 0.01 to 0.15 μm and the pore of 0.15 to 2.0 μm controlled in the catalyst layer of Patent Document 1 correspond to a pore (a secondary pore) between the carriers, and the control of a macroscopic structure of such a catalyst layer allows gas transportability in the catalyst layer to be improved and consequently allows power generation performance to be improved. However, in the catalyst layer, the available reaction surface area of the catalyst is still so small that an expensive catalyst needs to be used in large amounts for securing sufficient power generation characteristics. That is to say, in the case of reducing the used amount of the catalyst, power generation characteristics are deteriorated, so that the problem is that the used amount of the catalyst may not be reduced.

Then, the object of the present invention is to provide a catalyst layer for a fuel cell, which exhibits excellent power generation performance even in the case of reducing the used amount of a catalyst.

The inventors of the present invention have found out that a micro-structure in the vicinity of the catalyst influences power generation performance greatly. Then, they have completed the present invention by finding out that the above-mentioned problems may be solved in such a manner that a mode diameter of the pore distribution of pores (primary pores) in a porous carrier is controlled to a predetermined range and the catalyst is supported in the primary pores.

That is to say, a catalyst layer for a fuel cell of the present invention comprises a catalyst, a porous carrier for supporting the above-mentioned catalyst, and a polymer electrolyte. Then, a mode diameter of the pore distribution of the above-mentioned porous carrier is 4 to 20 nm, and the above-mentioned catalyst is supported in a pore with a pore diameter of 4 to 20 nm of the above-mentioned porous carrier.

MODE FOR CARRYING OUT THE INVENTION

An embodiment of the present invention is an electrode catalyst layer for a fuel cell (also referred to simply as "a catalyst layer" hereinafter) comprising a catalyst, a porous carrier for supporting the above-mentioned catalyst, and a polymer electrolyte, in which a mode diameter of the pore distribution of the above-mentioned porous carrier is 4 to 20 nm, and the above-mentioned catalyst is supported in a pore with a pore diameter of 4 to 20 nm of the above-mentioned porous carrier.

According to the catalyst layer of the present invention, a mode diameter of the pore distribution of the porous carrier is controlled to a predetermined range and the catalyst is supported in the primary pore of the porous carrier. Thus, the polymer electrolyte is prevented from adsorbing on the catalyst surface existing in the primary pore, and gas transportability may be sufficiently secured while preventing the available reaction surface area of the catalyst from decreasing. As a result, activity per catalyst weight is improved, and the catalyst layer for a fuel cell, which exhibits excellent power generation performance, is provided even in the case of reducing the catalyst amount. Incidentally, "the catalyst is supported in the pore" signifies that the center of gravity of the catalyst particle is located inside the pore (the opposite side to the surface; the deep side in the depth direction of the pore) from a line which connects both end points of the pore opening on the catalyst layer surface in a cross section of the catalyst layer (the porous carrier).

Embodiments according to the present invention will be described below with reference to the accompanying drawings. Incidentally, the following embodiment should not be construed to limit the present invention. Also, the scaling factors of the drawings may vary from those of the actual components because of intentional exaggerations for the sake of explanations.

First, the basic configuration of a polymer electrolyte fuel cell to which the catalyst layer of the present embodiment may be applied is described while using the drawings.

Figure 1:
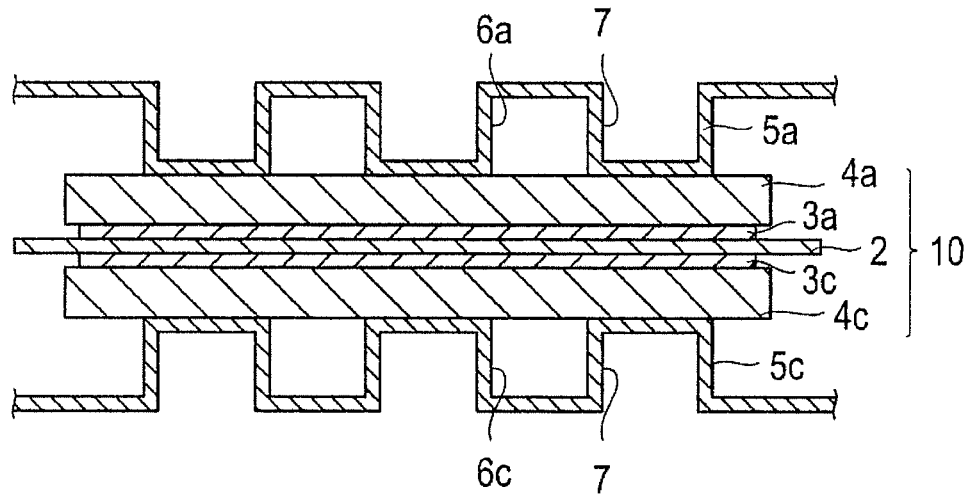
FIG. 1 is a schematic view showing a basic configuration of a polymer electrolyte fuel cell (PEFC) according to an embodiment of the present invention.

FIG. 1 is a schematic view showing the basic configuration of a polymer electrolyte fuel cell (PEFC) 1 according to an embodiment of the present invention. First, the PEFC 1 has a solid polymer electrolyte membrane 2, and a pair of catalyst layers (an anode catalyst layer 3a and a cathode catalyst layer 3c) which sandwich it. Then, the laminated body of the solid polymer electrolyte membrane 2 and the catalyst layers (3a and 3c) is further sandwiched between a pair of gas diffusion layers (GDL) (an anode gas diffusion layer 4a and a cathode gas diffusion layer 4c). Thus, the solid polymer electrolyte membrane 2, the pair of catalyst layers (3a and 3c) and the pair of gas diffusion layers (4a and 4c) constitute a membrane electrode assembly (MEA) 10 in a laminated state.

In the PEFC 1, the MEA 10 is further sandwiched between a pair of separators (an anode separator 5a and a cathode separator 5c). In FIG. 1, the separators (5a and 5c) are shown as being located at both ends of the shown MEA 10. However, in a fuel cell stack in which a plurality of MEAs is stacked up, the separators are generally used also as the separators for the adjacent PEFC (not shown). In other words, the MEAs constitute a stack by being sequentially laminated through the separators in the fuel cell stack. Incidentally, in an actual fuel cell stack, gas sealing parts are disposed between the separators (5a and 5c) and the solid polymer electrolyte membrane 2 as well as between the PEFC 1 and other PEFCs adjacent thereto, but such description are omitted in FIG. 1.

The separators (5a and 5c) are obtained by, for example, applying a press forming process to thin plates with a thickness of 0.5 mm or less to form a corrugating shape as shown in FIG. 1. The convex areas of the separators (5a and 5c) seen from the MEA side are in contact with the MEA 10. This provides a secure electrical connection with the MEA 10. Also, the concave areas of the separators (5a and 5c) seen from the MEA side (the space between the separators and the MEA generated due to a corrugating shape of the separators) serve as the gas passages for the gas to pass through during the operation of the PEFC 1. More specifically, let the fuel gas (such as hydrogen) flow through the gas passage 6a of the anode separator 5a, and let the oxidant gas (such as air) flow through the gas passage 6c of the cathode separator 5c.

On the other hand, the concave areas of the separators (5a and 5c) seen from the opposite side to the MEA side serve as the refrigerant passage 7 for allowing the refrigerant (such as water) for cooling the PEFC to pass through during the operation of the PEFC 1. Moreover, a manifold (not shown) is ordinarily provided for the separator. This manifold serves as the connecting means for connecting each cell when the stack is formed. With such a configuration, mechanical strength of the fuel cell stack is secured.

Incidentally, in the embodiment shown in FIG. 1, the separators (5a and 5c) are formed into a corrugating shape. However, it should not be construed that the separator always take such a corrugating shape, but rather it can have any arbitrary shape including a flat shape or a partially corrugating shape so long as it can provide a function of the gas passage or the refrigerant passage.

The catalyst layers (3a and 3c) of the present embodiment are described below in detail.

(Catalyst Layer)

The catalyst layers (anode catalyst layers 3a and cathode catalyst layers 3c) are the layers where the actual battery reactions occur. More specifically, the oxidation reaction of hydrogen occurs in the anode catalyst layer 3a, while the reduction reaction of oxygen occurs in the cathode catalyst layer 3c.

The catalyst layer comprises a catalyst, a porous carrier for supporting the catalyst, and an electrolyte. The complex consisting of catalyst components supported on a catalyst carrier is hereinafter called "electrode catalyst" as well.

Figure 2:
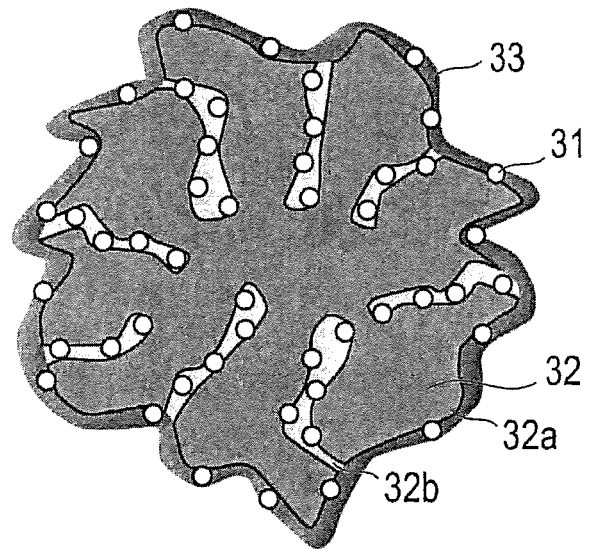
FIG. 2 is a pattern diagram showing a conventional electrode catalyst comprising a carbon carrier, catalyst particles and a polymer electrolyte, as comparative examples against an embodiment of the present invention.

Conventionally, the porous carrier made of a carbon material (also referred to as "a carbon carrier" hereinafter) has been used as a carrier for supporting the catalyst. FIG. 2 is a pattern diagram showing a conventional electrode catalyst comprising a typical carbon carrier used conventionally, catalyst particles and a polymer electrolyte. The electrode catalyst 30 comprises a carbon carrier 32 for supporting catalyst particles 31, which is coated with a polymer electrolyte 33. As shown in FIG. 2, the catalyst particles 31 are supported on the outer peripheral surface (the surface) 32a of the carbon carrier 32 and the inner surface of pores (primary pores) 32b. Then, the carbon carrier 32 for supporting the catalyst particles 31 is coated with the polymer electrolyte 33.

Such a carbon carrier 32 corrodes so easily that a method for graphitizing the carbon carrier by heat treatment to improve corrosion resistance of the catalyst layer has been conventionally used. Generally, durability of the carbon carrier is improved by heat treatment, but simultaneously the problem is that dispersibility of the catalyst and specific surface area of the carrier are decreased and power generation efficiency is deteriorated. In particular, heat treatment is performed under high temperature in a conventional method, so that the problem is that the pores (the primary pores) in the carrier are closed in accordance with the graphitization of the carbon carrier to decrease the pores (the primary pores) in the carrier.

Figure 3A:
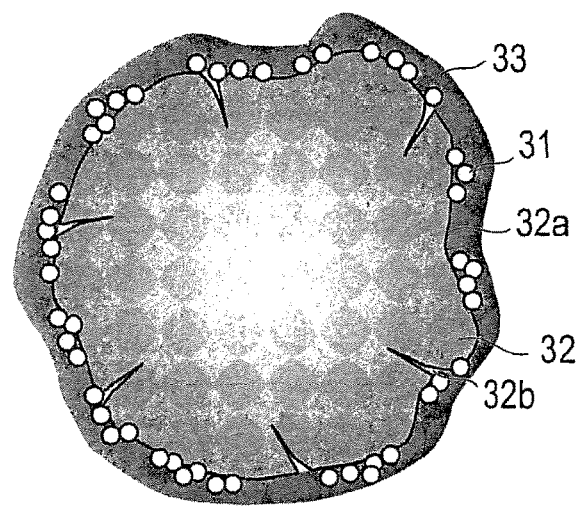
FIG. 3A is a pattern diagram showing a conventional electrode catalyst comprising a corrosion-resistant carbon carrier treated at high temperature, catalyst particles and a polymer electrolyte, as comparative examples against an embodiment of the present invention.

FIG. 3A is a pattern diagram showing a conventional electrode catalyst comprising a corrosion-resistant carbon carrier treated at high temperature, catalyst particles and a polymer electrolyte. As shown in FIG. 3A, the carbon carrier 32 heat-treated under high temperature scarcely exists in the electrode catalyst 30 for the reason that the primary pores 32b are closed. Also, even in the case where the primary pores 32b exist, the pore diameter and depth thereof are very small. Thus, the catalyst 31 may not be supported on the inner surface of the primary pores 32b. Accordingly, in the catalyst layer using such a carbon carrier, the catalyst particles 31 are supported on only the outer peripheral surface (the surface) 32a of the carbon carrier 32, and the carbon carrier 32 for supporting the catalyst particles 31 is coated with the polymer electrolyte 33.

In such an embodiment, the surface of the catalyst particles 31 is coated with the polymer electrolyte 33, so that the catalyst particles 31 may always contribute to power generation, while the effective surface area of the catalyst particles 31 is decreased by the coating to increase gas transport resistance.

In order to cope with such a problem, a method for controlling a pore capacity of 0.01 to 0.15 μm and a pore capacity of 0.15 to 2.0 μm in the catalyst layer in using a corrosion-resistant carbon carrier treated at high temperature as shown in FIG. 3A is disclosed in Patent Document 1.

Figure 3B:
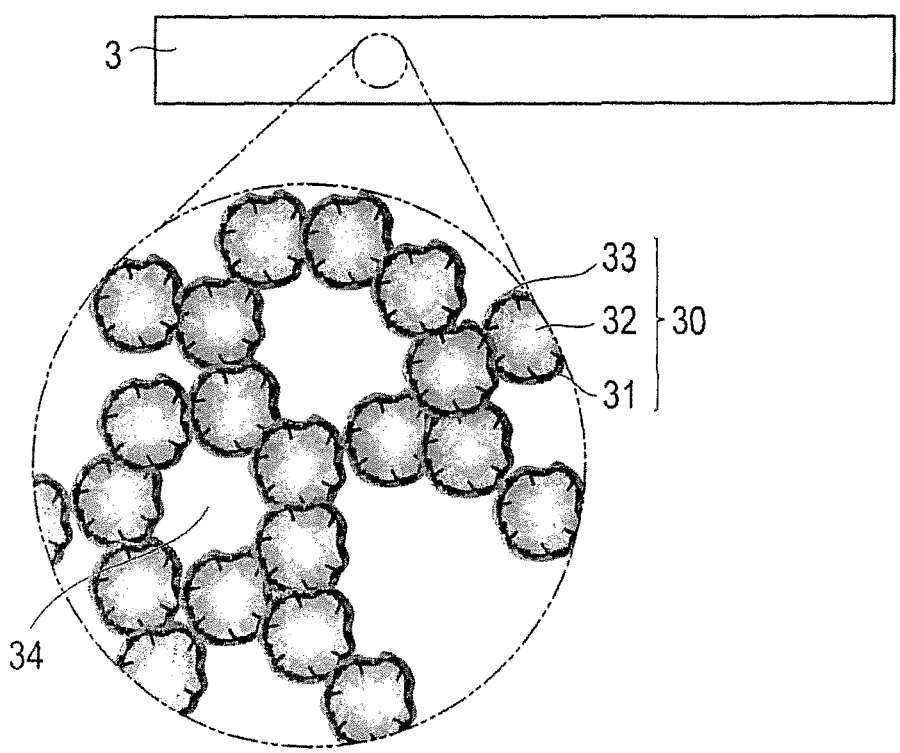
FIG. 3B is a pattern diagram of a catalyst layer composed of the electrode catalyst shown in FIG. 3A, in which a pore (a secondary pore) between carrier particles is controlled, as comparative examples against an embodiment of the present invention.

Generally, the particle diameter of the carbon carrier is several tens nm, so that pores of 0.01 to 0.15 μm and pores of 0.15 to 2.0 μm thereof derive from pores (secondary pores) between the carrier particles. Accordingly, in the catalyst layer described in Patent Document 1, it is conceived that the electrode catalyst has a structure as shown in FIG. 3B. FIG. 3B is a pattern diagram of a catalyst layer composed of the electrode catalyst shown in FIG. 3A, in which a pore (a secondary pore) between carrier particles is controlled. In the catalyst layer shown in FIG. 3B, the pores (the secondary pores) 34 between the carbon carriers 32 are controlled, and these secondary pores 34 function as a gas transport path and a drainage path, so that gas transportability in the catalyst layer may be improved. That is to say, the method of Patent Document 1 is a method such that the control of a macroscopic structure of the catalyst layer, which is the pores (the secondary pores) between the carbon carriers, allows the gas transport path and the drainage path to be secured and allows gas transportability in the catalyst layer to be improved.

However, in the catalyst layer of Patent Document 1, as shown in FIG. 3A, the effective surface area of the catalyst particles 31 is still so small that the problem is that an expensive catalyst needs to be used in large amounts for securing sufficient power generation characteristics.

Through detailed studies on a relation between pore structure of the catalyst layer and power generation performance, the inventors of the present invention have found out that a micro-pore structure in the vicinity of the catalyst influences power generation performance greatly in the case of reducing the used amount of the catalyst. In particular, an adsorption (coating) state of the polymer electrolyte on the catalyst surface and gas transport resistance in the primary pores in the carrier influence power generation performance greatly. Then, they have found out that the control of a mode diameter of the pore distribution of the primary pores in the carrier allows power generation performance to be prevented from deteriorating even in the case of reducing the used amount of the catalyst.

Figure 4:
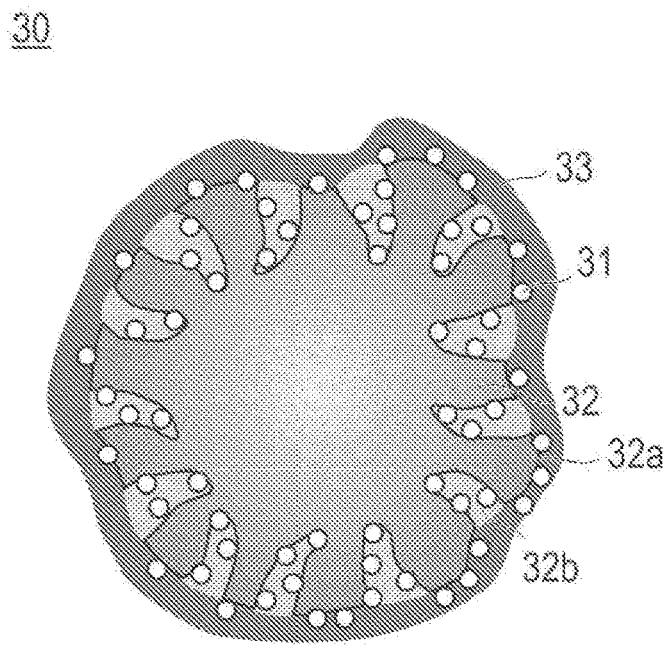
FIG. 4 is a pattern diagram showing an electrode catalyst comprising a carbon carrier, catalyst particles and a polymer electrolyte, which composes a catalyst layer according to an embodiment of the present invention.

FIG. 4 is a pattern diagram showing an electrode catalyst comprising a porous carrier, catalyst particles and a polymer electrolyte, which composes a catalyst layer according to an embodiment of the present invention.

As shown in FIG. 4, the electrode catalyst 30 has a structure such that the porous carrier 32 for supporting the catalyst (particles) 31, which is coated with the polymer electrolyte 33. The catalyst particles 31 are supported on the outer peripheral surface (the surface) 32a of the porous carrier 32 of the present embodiment and the inner surface of the pores (the primary pores) 32b. The outer peripheral surface (the surface) 32a of the porous carrier 32 and the catalyst particles 31 existing on the outer peripheral surface (the surface) 32a thereof are coated with the polymer electrolyte 33. Then, in the electrode catalyst 30, the catalyst particles 31, which are not coated with the polymer electrolyte 33, exist on the inner surface of the pores (the primary pores) 32*b*.

The catalyst (particles) 31, the porous carrier 32 and the polymer electrolyte 33 composing the electrode catalyst 30 are described below.

(Porous Carrier)

The porous carrier is a carrier for supporting the catalyst and functions as an electronic conduction path related to the transfer of electrons between the catalyst and other members.

The present invention is characterized in that a mode diameter of the pore distribution of the primary pores of the porous carrier is controlled to 4 to 20 nm. That is to say, in the present invention, the primary pores 32*b* of the porous carrier 32 are formed more widely and shallowly than a conventional porous carrier (the form shown in FIG. 2). For example, as described in the after-mentioned Comparative Example 2, a mode diameter of the primary pores before heat-treating carbon black used conventionally as a porous carrier is less than 4 nm. In the present embodiment, a mode diameter of the pore distribution of the primary pores is controlled by heat treatment to 4 to 20 nm, which is wider as compared with that before heat treatment. The pores with a pore diameter of 4 to 20 nm are larger than the diameter of the catalyst particles 31 such as Pt, but the polymer electrolyte 33 intrudes thereinto with difficulty. The control of these pores (mode diameter) with a pore diameter of 4 to 20 nm allows the polymer electrolyte 33 to be prevented from intruding into the primary pores 32*a*, and allows the catalyst particles 31 to be supported on the inside of the pores (the primary pores) 32*a* with a pore diameter of 4 to 20 nm. Thus, in the catalyst layer according to the present embodiment, the catalyst 31 supported on the inside of the primary pores 32*a* may effectively prevented from contacting with the polymer electrolyte 33, and transport distance of gas to the catalyst particles may be decreased while sufficiently securing the catalyst particles 31, which are not coated with the electrolyte 33. As a result, the transportability of gas necessary for power generation may be improved while securing reaction activity area in the catalyst. Accordingly, excellent power generation performance may be maintained even in the case of reducing the catalyst amount.

Also, the pore capacity with a pore diameter of 4 to 20 nm of the porous carrier is preferably 0.23 to 0.78 $cm^3/g$. A pore capacity of 0.23 $cm^3/g$ or more allows the amount of the catalyst not coated with the electrolyte to be sufficiently secured, allows the effective surface area of the catalyst to be sufficiently secured, and allows proton transport resistance to be inhibited from increasing. On the other hand, a pore capacity of 0.78 $cm^3/g$ or less allows the catalyst layer to be prevented from thickening by reason of a decrease in bulk density of the porous carrier, and allows proton transport resistance and diffused resistor to be inhibited from increasing. In the present embodiment, the pore capacity with a pore diameter of 4 to 20 nm of the porous carrier is determined at 0.23 to 0.78 $cm^3/g$, so that the electrolyte coverage factor is decreased to allow proton transport resistance to be inhibited from increasing and allow activity per the same catalyst weight to be improved. Accordingly, the catalyst layer for a high durable fuel cell, which exhibits excellent power generation performance, may be provided even in the case of reducing the catalyst amount.

Incidentally, in the present specification, "pore diameter" signifies the diameter of a pore, which is measured by a nitrogen adsorption method. Also, "the pore capacity with a pore diameter of 4 to 20 nm of the porous carrier" signifies the total capacity of pores with a pore diameter of 4 to 20 nm existing in the porous carrier, and is calculated as an area (an integrated value) under a differential pore distribution curve obtained by a nitrogen adsorption method. The differential pore distribution is a distribution curve obtained by plotting a pore diameter on the horizontal axis and a pore capacity corresponding to the pore diameter in a sample on the vertical axis. That is to say, in the case of regarding the pore capacity of the porous carrier obtained by a nitrogen adsorption method as V and the pore diameter as D, a value (dV/d(log D)) such that differential pore capacity dV is divided by logarithmic difference of the pore diameter d(log D) is calculated. Then, the differential pore distribution curve is obtained by plotting this dV/d(log D) on the average pore diameter of each section. The differential pore capacity dV signifies the increment of the pore capacity between measuring points.

In the present embodiment, a mode diameter (a model diameter) of the pore distribution of the porous carrier is 4 to 20 nm. The solid electrolyte (ionomer; the polymer electrolyte) may not intrude into the pores of the porous carrier with a mode diameter in such a range, and the catalyst particles may be selectively retained by a sufficient amount. Accordingly, the electrolyte coverage factor may be decreased, gas transportability may be improved, and consequently activity per the same catalyst weight may be improved. A mode diameter of the pore distribution of the porous carrier is more preferably 4 to 15 nm. Incidentally, "a mode diameter of the pore distribution" signifies the pore diameter of the point such as to take a peak value (the largest frequency) in the differential pore distribution curve obtained by a nitrogen adsorption method.

The material for the porous carrier is not particularly limited as long as the primary pores with the above-mentioned mode diameter can be formed in the carrier and the material has sufficient specific surface area and sufficient electron conductivity for supporting the catalyst component in a desired distributed state. The main component is preferably carbon. More specifically, examples thereof include carbon particles made of carbon black (such as Ketjen black, oil furnace black, channel black, lamp black, thermal black and acetylene black), and activated carbon. "The main component is carbon" signifies that carbon atoms are contained as the main component, and is a concept including both "consisting only of carbon atoms" and "consisting substantially of carbon atoms", and elements except carbon atoms may be contained. "Consisting substantially of carbon atoms" signifies that the mixing of approximately 2 to 3% by mass or less of impurities is allowable.

More preferably, it is desirable to use carbon black for the reason that a desired pore region is easily formed in the carrier; particularly preferably, Ketjen black is used.

In addition, the crystallinity of the carbon carrier is preferably controlled for the purpose of improving corrosion resistance of the catalyst layer. C band peak intensity and D band peak intensity calculated by Raman scattering spectral analysis may be used for the crystallinity and the crystalline composition of the carbon material.

When the carbon material is analyzed by Raman spectroscopy, a peak ordinarily occurs in the vicinity of 1340 $cm^{-1}$ and in the vicinity of 1580 $cm^{-1}$. These peaks are ordinarily called "D band" and "G band" respectively. Incidentally, the peak of diamond is strictly 1333 $cm^{-1}$ and is distinguished from the above-mentioned D band.

In an embodiment of the present invention, the above-mentioned porous carrier is carbon black such that the half-value width of D band, which appears at 1340 $cm^{-1}$ in Raman spectrum, is 100 cm$^{-1}$ or less. Also, in an embodiment of the present invention, the above-mentioned porous carrier is such that the half-value width of G band, which appears at 1580 cm$^{-1}$ in Raman spectrum, is 60 cm$^{-1}$ or less. In these cases, corrosion resistance of the catalyst layer is improved by the graphitization of the carbon carrier; thus, the catalyst layer, in which the initial performance is high and the performance may be maintained over a long term, may be provided.

The lower limit values of the above-mentioned half-value width of D band and the above-mentioned half-value width of G band are not particularly limited. However, the primary pores are closed simultaneously with the progress of the graphitization of the carrier, so that it is preferable that the above-mentioned half-value width of D band is 50 cm$^{-1}$ or more and the above-mentioned half-value width of G band is 40 cm$^{-1}$ or more from the viewpoint of making the graphitization of the carrier compatible with the securing of the desired primary pore region.

Here, the Raman spectrum is a spectrum showing light with which wavelength is scattered at intensity of which level with regard to light scattered by the Raman effect. In the present invention, the half-value widths of D band and G band may be calculated by using the Raman spectrum in which wave number (cm$^{-1}$) is represented on one axis and intensity is represented on the other axis. Also, "half-value width" is a value used for determining a distributed state of a predetermined absorption band, and signifies spreading width of the absorption band at the half height of the peak height of the absorption band. Incidentally, these Raman spectrums may be measured with respect to the porous carrier before supporting the catalyst, but is preferably measured with respect to the porous carrier after supporting the catalyst. The presence or absence itself of the catalyst in the porous carrier does not influence the Raman spectrum, but the reason therefor is that there is a possibility that the surface of the porous carrier is modified by the catalyst supporting treatment.

In the case where the half-value width may not be determined at a glance from the spectrum for the reason that other absorption bands exist in the neighborhood of D band and G band to join to D band and G band, the half-value width may be ordinarily determined by an analysis program accompanying the Raman spectrum measuring apparatus. For example, the half-value width may be determined in such a manner that a straight base line is drawn in a region in which the peak of D band and G band is included to perform curve fit of Lorentz waveform and then peak separation of D band and G band.

Porous metals such as Sn (tin) and Ti (titanium) as well as conductive metallic oxides except the above-mentioned carbon material are usable as the porous carrier.

The BET specific surface area of the porous carrier may be a specific surface area sufficient to support the catalyst component in a highly distributed state, but is preferably within the range of 20 to 1600 m$^2$/g, or more preferably 80 to 1200 m$^2$/g. When the specific surface area of the catalyst carrier is a value within such a range, the balance between the dispersibility of the catalyst component on the catalyst carrier and the effective utilization rate of the catalyst component may be appropriately controlled.

The average particle diameter of the porous carrier is preferably 20 to 100 nm. Even in the case of providing the above-mentioned porous structure for the porous carrier, such a range allows mechanical strength to be maintained and allows the thickness of the catalyst layer to be controlled in an appropriate range. Unless otherwise mentioned, the value of "the average particle diameter of the porous carrier" adopts a value calculated as the average value of particle diameters of particles observed in several to several tens of visual fields by using observation means such as scanning electron microscope (SEM) and transmission electron microscope (TEM). Also, "particle diameter" signifies the longest distance among distances between two arbitrary points on a border line of the particle.

(Catalyst)

The catalyst has the function of offering the catalytic action of an electrochemical reaction. Any publicly known catalyst can be used for the anode catalyst layer so long as it offers a catalytic action to the oxidation reaction of hydrogen and there is no special restriction. Also, any publicly known catalyst can be used for the cathode catalyst layer so long as it offers a catalytic action to the reduction reaction of oxygen and there is no special restriction. More specifically, the catalysts are selected from metals such as platinum, ruthenium, iridium, rhodium, palladium, osmium, tungsten, lead, iron, chromium, cobalt, nickel, manganese, vanadium, molybdenum, gallium, and aluminum, as well as their alloys.

Of these, those which contain platinum at least partially are preferably used in order to improve catalytic activity, anti-toxicity against carbon monoxide and others, and heat resistance. That is to say, the catalyst preferably contains platinum or platinum-containing alloys. The above-mentioned alloy composition should preferably contain 30 to 90 atom % of platinum although it depends on the kind of metal to be alloyed, and the content of the metal to be alloyed with platinum should be preferably 10 to 70 atom %. Incidentally, alloy is generally a collective name of a combination of a metallic element combined with one or more kinds of other metallic elements or non-metallic elements, such a combination having metallic characteristics. An alloy structure can be an eutectic alloy which is a mixture of crystals of different component elements, or a solid solution which is formed by completely molten component elements, or a compound where component elements are intermetallic or partially metallic and partially non-metallic; any of them may be adopted in the present application. In this case, the catalyst used for the anode catalyst layer and the catalyst used for the cathode catalyst layer are both selected properly from among the above. Unless noted differently herein, the descriptions for the catalysts both for the anode catalyst layer and for the cathode catalyst layer define the same thing. However, the catalysts for the anode catalyst layer and for the cathode catalyst layer need not be the same, and should be selected properly so as to provide the desired functions as described above.

The shape and size of the catalyst component are not particularly limited, and the same shape and size can be used as the case of publicly known catalyst components. Examples of the shape to be used include a granular shape, a scaly shape and a laminar shape, preferably a granular shape. In this case, it is desirable that the average particle diameter of the catalyst particles is approximately 1 to 10 nm, additionally 1 to 5 nm, and particularly 2 to 4 nm. The average particle diameter of the catalyst particles of 10 nm or less allows the catalyst particles to be supported in the primary pores of the porous carrier by a simple method and allows the electrolyte coverage factor of the catalyst to be decreased. On the other hand, the average particle diameter of the catalyst of 1 nm or more allows elution by potential change to be prevented and allows the performance to be inhibited from deteriorating with time. Incidentally, "the average particle diameter of the catalyst particles" according to the present invention is determined as an average value of the crystallite diameter obtained by the X-ray diffraction from the half-band width of the diffraction peak of the catalyst component, and the particle diameter of the catalyst particles obtained from the transmission-type electron microscope (TEM).

In the present embodiment, the catalyst content per unit catalyst coated area (mg/cm$^2$) is not particularly limited so long as sufficient dispersity of the catalyst on the carrier and power generation performance are obtained, and is 0.01 to 1.0 mg/cm$^2$, for example.

However, in the case where the catalyst contains platinum or platinum-containing alloys, the platinum content per unit catalyst coated area is preferably 0.20 mg/cm$^2$ or less. The use of expensive noble-metal catalysts typified by platinum (Pt) and platinum alloys is a factor of expensive fuel cells. Accordingly, it is preferable that the used amount of expensive platinum (the platinum content) is decreased to the above-mentioned range to reduce the costs. The lower limit value is not particularly limited so long as power generation performance is obtained, and is 0.01 mg/cm$^2$ or more, for example. More preferably, the platinum content is 0.05 to 0.20 mg/cm$^2$. In the present embodiment, the control of the porous structure of the porous carrier allows activity per catalyst weight to be improved, so that the used amount of the expensive catalyst may be decreased.

Incidentally, in the present specification, the induction coupled plasma emission spectrography (ICP) is used for measuring (confirming) "the catalyst (platinum) content per unit catalyst coated area (mg/cm$^2$)". Those skilled in the art easily may perform a method for obtaining desired "the catalyst (platinum) content per unit catalyst coated area (mg/cm$^2$)" as well, and the control of the composition (catalyst concentration) and coating amount of slurry allows the content to be adjusted.

Also, the support amount (occasionally referred to also as the support rate) of the catalyst in the porous carrier is preferably 10 to 80% by mass, more preferably 30 to 70% by mass with respect to the whole amount of the catalyst carrier (namely, the porous carrier and the catalyst). The support amount in the above-mentioned range is preferable by reason of allowing sufficient dispersity of the catalyst components on the carrier, the improvement of power generation performance, the economic advantages, and the catalyst activity per unit mass.

(Polymer Electrolyte)

The ion-conducting polymer electrolyte is contained in the catalyst layer. The polymer electrolyte is also called the proton-conducting polymer by reason of playing a role of transmitting protons produced around the catalyst active material on the fuel electrode side.

The polymer electrolyte is not particularly limited, and can be properly referred to the knowledge of publicly available prior art. The polymer electrolyte is roughly divided into fluorine-based polymer electrolyte and hydrocarbon-based polymer electrolyte, depending on the kinds of ion exchange resins which the polymer electrolyte are made of.

Examples of the ion exchange resins which constitute the fluorine-based polymer electrolyte include: perfluorocarbon sulfonic acid-based polymers, perfluorocarbon phosphonic acid-based polymers, tri-fluorostyrene sulfonic acid-based polymers, ethylenetetrafluroroethylene-g-styrene sulfonic acid-based polymers, ethylene-tetrafluoroethylene copolymers, polyvinylidenefluoride-perfluorocarbon sulfonic acid-based polymers, such as Nafion (registered trademark of Dupont), Aciplex (registered trademark of Asahi Kasei Chemicals Corp.), and Flemion (registered trademark of Asahi Glass Co.). These fluorine-based polymer electrolytes are used preferably and fluorine-based polymer electrolytes consisting of perfluorocarbon sulfonic acid-based polymers are used particularly preferably, from the viewpoint of improving the power generation performance such as heat resistance and chemical stability.

Specific examples of the hydrocarbon-based electrolytes include: sulfonated polyether sulfon (S-PES), sulfonated polyaryletherketone, sulfonated polybenzimidazolealkyl, phosphonated polybenzimidazolealkyl, sulfonated polystyrene, sulfonated polyether etherketone (S-PEEK), sulfonatedpolyphenylene (S-PPP). These hydrocarbon-based polymer electrolytes are used preferably from the manufacturing standpoints that their raw materials are inexpensive, their manufacturing processes are simple, and their materials are highly selectable. Incidentally, the above-mentioned ion exchange resins may be used singly in only one kind or in combinations of two or more kinds. Also, the above-mentioned materials are not exclusive and other materials can be used as well.

The conductance of the protons is important in the polymer electrolyte which serves to transmit the protons. Here, in the case where EW of the polymer electrolyte is too large, ion conductivity of the whole catalyst layer deteriorates. Accordingly, the catalyst layer according to the present embodiment preferably contains the polymer electrolyte with small EW. More specifically, the catalyst layer according to the present embodiment contains preferably the polymer electrolyte with an EW of 1000 or less, more preferably the polymer electrolyte with an EW of 700 or less.

On the other hand, in the case where EW is too small, the hydrophilic property is so high that smooth movement of water becomes difficult. The EW of the polymer electrolyte is preferably 600 or more from such a viewpoint. Incidentally, EW (Equivalent Weight) represents the equivalent weight of an exchange group with proton conductivity. The equivalent weight is dry weight of an ion exchange membrane per equivalent of the ion exchange group, and represented by a unit of "g/eq".

(Liquid Proton-Conducting Material)

The catalyst layer according to the present embodiment preferably contains a liquid proton-conducting material capable of connecting the catalyst and the polymer electrolyte in a proton-conductable state between the catalyst and the polymer electrolyte. The introduction of the liquid proton-conducting material allows a proton transport path through the liquid proton-conducting material to be secured between the catalyst and the polymer electrolyte, and allows protons necessary for the power generation to be efficiently transported to the catalyst surface. Thus, utilization efficiency of the catalyst is improved, so that the used amount of the catalyst may be reduced while maintaining the power generation performance. This liquid proton-conducting material may intervene between the catalyst and the polymer electrolyte, and may be disposed in the pores (the secondary pores) between the porous carriers and the pores (the primary pores) in the porous carrier in the catalyst layer.

The liquid proton-conducting material is not particularly limited so long as the liquid proton-conducting material has ion conductivity and may perform the function of forming the proton transport path between the catalyst and the polymer electrolyte. Specific examples thereof include water, protic ionic liquid, perchloric acid aqueous solution, nitric acid aqueous solution, formic acid aqueous solution, and acetic acid aqueous solution.

In the case of using water as the liquid proton-conducting material, water as the liquid proton-conducting material may be introduced into the catalyst layer by wetting the catalyst layer with a small amount of liquid water or humidified gas before starting the power generation. Also, produced water by an electrochemical reaction in operating a fuel cell may be utilized as the liquid proton-conducting material. Accordingly, the liquid proton-conducting material need not always be retained in a state of starting to operate a fuel cell.

In the case of using a material except water, such as the ionic liquid, as the liquid proton-conducting material, it is desirable that the ionic liquid, the polymer electrolyte and the catalyst are dispersed into a solution in producing catalyst ink, and the ionic liquid may be added in coating the catalyst on the catalyst layer substrate.

With regard to the catalyst layer according to an embodiment of the present invention, electric double layer capacity at an interface between the catalyst/the liquid proton-conducting material, which is measured in a state such that the liquid proton-conducting material is filled into the pores of the above-mentioned porous carrier, is larger than electric double layer capacity at an interface between the catalyst/the polymer electrolyte.

The electric double layer capacity is in proportion to the area of an electrochemically effective interface. Accordingly, the electric double layer capacity formed at an interface between the catalyst-the polymer electrolyte and an interface between the catalyst-the liquid proton-conducting material corresponds to contact area between the catalyst-the polymer electrolyte and between the catalyst-the liquid proton-conducting material, respectively. Accordingly, in the case where the electric double layer capacity formed at an interface between the catalyst-the liquid proton-conducting material is larger than the electric double layer capacity formed at an interface between the catalyst-the polymer electrolyte, the polymer electrolyte coverage factor of the catalyst is decreased to allow activity per catalyst weight to be improved; consequently, cell voltage is improved.

Here, the electric double layer capacity formed at each of an interface between the catalyst-the polymer electrolyte and an interface between the catalyst-the liquid proton-conducting material may be measured in accordance with the following method, for example.

That is to say, in the catalyst layer according to the present embodiment, the interfaces of four kinds:

(1) the catalyst-the polymer electrolyte (C-S)
(2) the catalyst-the liquid proton-conducting material (C-L)
(3) the porous carrier-the polymer electrolyte (Cr-S)
(4) the porous carrier-the liquid proton-conducting material (Cr-L) may contribute as the electric double layer capacity (Cdl).

As described above, the electric double layer capacity is in proportion to the area of an electrochemically effective interface, so that $Cdl_{C-S}$ (the electric double layer capacity at an interface between the catalyst-the polymer electrolyte) and $Cdl_{C-L}$ (the electric double layer capacity at an interface between the catalyst-the liquid proton-conducting material) may be measured. Then, the contribution of the interfaces of the above-mentioned four kinds to the electric double layer capacity (Cdl) may be separated in the following manner.

First, the electric double layer capacity is measured under each of the high-humidified conditions such as 100% RH and the low-humidified conditions such as 10% RH. Incidentally, examples of a measuring method for the electric double layer capacity include cyclic voltammetry and electrochemical impedance spectroscopy. The comparison therebetween allows the contribution of the liquid proton-conducting material (in this case, "water"), namely, the above-mentioned (2) and (4) to be separated.

Further, deactivation of the catalyst, for example, in the case of using Pt as the catalyst, deactivation of the catalyst by supplying CO gas to an electrode targeted for measuring to adsorb CO on the Pt surface allows the contribution to the electric double layer capacity to be separated. In such a state, the electric double layer capacity on the high-humidified and low-humidified conditions is measured by the same method as described above, and the comparison therebetween allows the contribution of the catalyst, namely, the above-mentioned (1) and (2) to be separated.

Through the above, all of the contributions of the above-mentioned (1) to (4) may be separated, and the electric double layer capacity formed at both an interface between the catalyst and the polymer electrolyte and an interface between the catalyst and the liquid proton-conducting material may be obtained.

That is to say, a measured value (A) in the high-humidified state becomes the electric double layer capacity formed at all interfaces of the above-mentioned (1) to (4), and a measured value (B) in the low-humidified state becomes the electric double layer capacity formed at interfaces of the above-mentioned (1) and (3). Also, a measured value (C) in the catalyst deactivation and high-humidified state becomes the electric double layer capacity formed at interfaces of the above-mentioned (3) and (4), and a measured value (D) in the catalyst deactivation and low-humidified state becomes the electric double layer capacity formed at an interface of the above-mentioned (3).

Accordingly, a difference between A and C becomes the electric double layer capacity formed at interfaces of (1) and (2), and a difference between B and D becomes the electric double layer capacity formed at an interface of (1). Then, the electric double layer capacity formed at an interface of (2) may be obtained by calculating a difference between these values, that is, (A−C)−(B−D).

The catalyst layer may contain additives, for example, water-repellent agent such as polytetrafluoroethylene, polyhexafluoropropylene and tetrafluoroethylene-hexafluoropropylene copolymer, dispersant such as a surface-active agent, thickener such as glycerin, ethylene glycol (EG), polyvinyl alcohol (PVA) and propylene glycol (PG), and pore-forming material, as required.

The thickness of the catalyst layer (after drying) is preferably 0.5 to 30 μm, more preferably 1 to 20 μm, far more preferably 1 to 10 μm, and particularly preferably 1 to 5 μm. Incidentally, the above-mentioned thickness is applied to both the cathode catalyst layer and the anode catalyst layer. However, the thickness of the cathode catalyst layer and the anode catalyst layer may be the same or different.

(Method for Producing Catalyst Layer)

Preferable embodiments for producing the catalyst layer are described below, and the technical scope of the present invention is not limited to only the following embodiments. Also, the conditions such as a material for each component of the catalyst layer are as described above; therefore, the description herein is omitted.

First, a porous carrier is prepared and heat-treated to thereby control a porous structure. More specifically, the porous carrier may be heated under an inert gas atmosphere at a temperature of 1500 to 2500° C. for 2 to 1200 minutes. Thus, pores in the porous carrier are formed shallowly and widely to allow a desired porous structure (a pore capacity with a pore diameter of 4 to 20 nm and a mode diameter of the pore distribution). Also, this heat treatment promotes the graphitization of the porous carrier simultaneously to allow corrosion resistance to be improved. The heating temperature is more preferably 1500 to 2000° C., far more preferably 1500 to 1800° C.

The conditions of the heat treatment vary with the material and are properly determined so as to allow the desired porous structure. Generally, the high heating temperature brings a tendency for a mode diameter of the pore distribution to shift toward the direction of a pore diameter. Such conditions of the heat treatment may be determined in accordance with the material while confirming the porous structure and those skilled in the art will be capable of determining easily. Incidentally, a technique for graphitizing the carrier by heat-treating at high temperature has been conventionally known; most pores in the carrier are closed in the conventional heat treatment, and a micro-pore structure (wide and shallow primary pores) in the vicinity of the catalyst has not been controlled.

Next, the catalyst is supported on the porous carrier to obtain the catalyst powder. The supporting of the catalyst on the porous carrier may be performed by publicly known methods. Examples of the publicly known methods to be used include impregnation method, liquid-phase reduction supporting method, evaporation to dryness method, colloidal adsorption method, atomized pyrolysis method, and reverse micelle (microemulsion method).

Subsequently, catalyst ink containing the catalyst powder, the polymer electrolyte and a solvent is produced. The solvent is not particularly limited and ordinary solvents to be used for forming the catalyst layer may be used similarly. Specific examples to be used include water such as running tap water, pure water, ion-exchange water and distilled water, and lower alcohol with a carbon number of 1 to 4 such as cyclohexanol, methanol, ethanol, n-propanol, isopropanol, n-butanol, sec-butanol, isobutanol and tert-butanol. These solvents may be used singly in one kind or in mixed liquid of two or more kinds.

The amount of the solvent composing the catalyst ink is not particularly limited so long as the amount is an amount such as to allow the electrolyte to be completely dissolved. More specifically, the concentration of the solid content containing the catalyst powder and the polymer electrolyte is preferably 8 to 50% by mass, more preferably 10 to 25% by mass in the electrode catalyst ink.

Incidentally, in the case of using additives such as water-repellent agent, dispersant, thickener and pore-forming material, these additives may be added to the catalyst ink. On this occasion, the added amount of the additives is not particularly limited so long as the amount is an amount such as not to disturb the above-mentioned effect of the present invention. For example, the added amount of each of the additives is preferably 5 to 20% by mass with respect to the whole mass of the electrode catalyst ink.

Next, the catalyst ink is coated on the surface of a substrate. A coating method on the substrate is not particularly limited and publicly known methods may be used. More specifically, publicly known methods such as spray (spray coating) method, Gulliver printing method, die coater method, screen printing method and doctor blade method may be used.

On this occasion, a solid polymer electrolyte membrane (an electrolyte layer) and a gas diffusion substrate (a gas diffusion layer) may be used as the substrate coated with the catalyst ink. In such a case, after forming the catalyst layer on the surface of a solid polymer electrolyte membrane (an electrolyte layer) or a gas diffusion substrate (a gas diffusion layer), an obtained laminated body may be directly utilized for producing a membrane electrode assembly. Alternatively, a peelable substrate such as Teflon (registered trademark) sheet is used as the substrate, and the catalyst layer may be obtained by forming the catalyst layer on the substrate to thereafter peel the catalyst layer portion off the substrate.

Lastly, a coated layer (membrane) of the catalyst ink is dried under the air atmosphere or an inert gas atmosphere at room temperature to 100° C. for 30 to 60 minutes. Thus, the catalyst layer is formed.

(Membrane Electrode Assembly)

Another embodiment of the present invention provides a membrane electrode assembly for a fuel cell having a solid polymer electrolyte membrane 2, a cathode catalyst layer disposed on one side of the above-mentioned solid polymer electrolyte membrane, an anode catalyst layer disposed on the other side of the above-mentioned solid polymer electrolyte membrane, and a pair of gas diffusion layers (4a and 4c) for sandwiching the above-mentioned solid polymer electrolyte membrane 2, the above-mentioned anode catalyst layer 3a and the above-mentioned cathode catalyst layer 3c. Then, in this membrane electrode assembly, at least one of the above-mentioned cathode catalyst layer and anode catalyst layer is the catalyst layer of the embodiment described in the above.

However, in consideration of the necessity for the improvement of proton conductivity and the improvement of the transport property (the gas diffusivity) of reactant gas (particularly $O_2$), at least the cathode catalyst layer is preferably the catalyst layer of the embodiment described in the above. However, the catalyst layer according to the above-mentioned embodiment is not particularly limited; for example, the catalyst layer may be used as the anode catalyst layer, or as both the cathode catalyst layer and the anode catalyst layer.

Another embodiment of the present invention provides a fuel cell having the membrane electrode assembly according to the above-mentioned embodiment. That is to say, an embodiment of the present invention is a fuel cell having a pair of an anode separator and a cathode separator for sandwiching the membrane electrode assembly according to the above-mentioned embodiment.

The constituents of the PEFC 1 using the catalyst layer according to the above-mentioned embodiment are described below with reference to FIG. 1. However, the features of the present invention are based on the catalyst layer. Therefore, the specific configurations of members except the catalyst layer composing the fuel cell may be properly modified with reference to the knowledge of publicly available prior art.

(Electrolyte Layer)

The electrolyte layer, for example, consists of a solid polymer electrolyte membrane 2 such as can be seen in the configuration shown in FIG. 1. This solid polymer electrolyte membrane 2 has the function of allowing the protons generated in an anode catalyst layer 3a to be selectively transmitted to a cathode catalyst layer 3c along the membrane thickness direction during the operation of a PEFC 1. Also, the solid polymer electrolyte membrane 2 serves as a bulkhead to prevent the fuel gas supplied to the anode side from mixing with the oxidant gas supplied to the cathode side.

An electrolyte material composing the solid polymer electrolyte membrane 2 is not particularly limited, and can be properly referred to the knowledge of publicly available prior art. For example, the fluorine-based polymer electrolyte and the hydrocarbon-based polymer electrolyte, which are described as the polymer electrolyte in the above, may be used. On this occasion, the same as the polymer electrolyte used for the catalyst layer need not always be used.

The thickness of the electrolyte layer may be properly determined in consideration of the characteristics of the obtained fuel cell, and not particularly limited. The thickness of the electrolyte layer is ordinarily approximately 5 to 300 μm. The balance between the strength during the manufacturing process of the membrane, the durability during usage, and output performance during usage can be properly controlled, if the thickness of the electrolyte layer is within such a range.

(Gas Diffusion Layer)

The gas diffusion layers (the anode gas diffusion layer 4a and the cathode gas diffusion layer 4c) have the function of promoting the diffusion of the gas (the fuel gas or the oxidant gas) supplied through the gas passages (6a and 6c) of the separator to the catalyst layers (3a and 3c), as well as the function as the electronic conduction path.

A material composing a substrate of the gas diffusion layers (4a and 4c) is not particularly limited, and can be properly referred to the knowledge of publicly available prior art. Examples thereof include sheet-like materials with conductivity and porosity, such as fabrics made of carbon, paper-like paper-making material, felt and unwoven fabric. The thickness of the substrate may be properly determined in consideration of the characteristics of the obtained gas diffusion layer, but it should be approximately 30 to 500 μm. If the thickness of the substrate is a value within such a range, the balance between the mechanical strength and the diffusivity of gas and water can be properly controlled.

The gas diffusion layer preferably contains water-repellent agent with the aim of enhancing water repelling capability to prevent a flooding phenomenon and the like. Examples of the water-repellent agents include, but not particularly limited to, fluorine-based polymer materials such as polytetrafluoroethylene (PTFE), polyfluorovinylidene (PVdF), polyhexafluoropropylene and tetrafluoroethylene-hexafluoropropylene copolymer (FEP), as well as polyethylene and polypropylene.

Also, in order to further improve water repelling capability, the gas diffusion layer may be such as to have a carbon particle layer comprising an aggregate of carbon particles containing the water-repellent agent (a microporous layer; MPL, not shown in the drawings) on the catalyst layer side of the substrate.

The carbon particles contained in the carbon particle layer are not particularly limited, and any publicly known materials such as carbon black, graphite and expanded graphite may be properly adopted. Among them, carbon black such as oil furnace black, channel black, lamp black, thermal black and acetylene black may be preferably used by reason of having excellent electron conductivity and large specific surface area. The average particle diameter of the carbon particles is preferably approximately 10 to 100 μm. Thus, high drainage by capillary force is obtained and the contact with the catalyst layer may be improved.

Examples of the water-repellent agent used for the carbon particle layer include the same as the above-mentioned water-repellent agent. Above all, the fluorine-based polymer materials may be preferably used by reason of being excellent in water repelling capability and corrosion resistance during the electrode reaction.

The mixing ratio between the carbon particles and the water-repellent agent in the carbon particle layer should be approximately 90:10 to 40:60 at ratio of mass (carbon particles:water-repellent agent) in consideration of the balance between the water repelling capability and the electron conductivity. Incidentally, also the thickness of the carbon particle layer is not particularly limited and may be properly determined in consideration of the water repelling capability of the obtained gas diffusion layer.

(Producing Method for Membrane Electrode Assembly)

The method of producing the membrane electrode assembly is not particularly limited, and any publicly known method may be used. For example, it is possible to use the method of transferring by means of a hot press or coating the catalyst layer on the solid polymer electrolyte membrane, drying it, and assembling it to the gas diffusion layer, or the method of producing two gas diffusion electrodes (GDE) by previously coating the catalyst layer on the microporous layer side of the gas diffusion layer (or on one side of the substrate layer if the microporous layer is not included) and drying it, and assemble these gas diffusion electrodes on both sides of the solid polymer electrolyte membrane by means of a hot press. The coating and assembly conditions of the hot press and the like may be properly adjusted, depending on the kinds (perfluorosulfonic acid-based and hydrocarbon-based) of the solid polymer electrolyte membrane and the polymer electrolyte in the catalyst layer.

(Separator)

The separator has the function of electrically connecting each cell in series when configuring the fuel cell stack by connecting in series a plurality of single cells of the fuel cell such as a polymer electrolyte fuel cell. Also, the separator has the function of serving as a bulkhead for separating fuel gas, oxidant gas and refrigerant from each other. In order to secure these passages, as described above, a gas passage and a refrigerating passage are preferably provided on each of the separators. As the material for composing the separators, any publicly known materials, for example, carbon such as dense carbon graphite and carbon plate, or a metallic material such as stainless steel can be properly adopted without any limitation. The thickness and size of the separators, and the shape and size of each passage to be provided are not particularly limited, and may be properly determined in consideration of the desired output performance of the obtained fuel cell.

Although the kinds of the above-mentioned fuel cells are not particularly limited and the polymer electrolyte fuel cell is described as an example in the above-mentioned description, other examples thereof include alkaline fuel cell, direct methanol fuel cell, and micro fuel cell. Among them, the polymer electrolyte fuel cell is the most preferable by reason of allowing a smaller size, a higher density and a higher output. Also, although the above-mentioned fuel cell is useful not only as a mobile power source such as a motor vehicle where the installation space is limited, but also as a stationary power source, the fuel cell may be used particularly appropriately for automobile use where system startup and stop as well as output fluctuations occur frequently.

The method for producing the fuel cell is not particularly limited and various publicly known methods in the field of the fuel cell can be properly referred to.

The fuel to be used for operating the fuel cell is not particularly limited. Examples of the fuel to be used include hydrogen, methanol, ethanol, 1-propanol, 2-propanol, 1-butanol, secondary butanol, tertiary butanol, dimethyl ether, diethyl ether, ethylene glycol, and diethylene glycol. Of these, hydrogen and methanol are preferably used in view of allowing a higher output.

Moreover, in order that the fuel cell can generate a desired voltage, a fuel cell stack, which has a structure such as to connect in series a plurality of layers of membrane electrode assemblies through the separators, may be formed. The shape of the fuel cell is not particularly limited, but may be properly determined in such a manner as to allow battery characteristics such as the desired voltage.

The above-mentioned PEFC 1 and membrane electrode assembly use the catalyst layer excellent in power generation performance and durability. Accordingly, the PEFC 1 and the membrane electrode assembly are excellent in power generation performance and durability.

The PEFC 1 and the fuel cell stack using this according to the present embodiment can be mounted on a motor vehicle as a drive power source, for example.

EXAMPLE

Although the effect of the present invention is described below by using examples and comparison examples, the technical scope of the present invention is not limited to these examples.

Example 1

(1) Production of Membrane Electrode Assembly (MEA)

(a) Cathode Catalyst Layer

Figure 5:
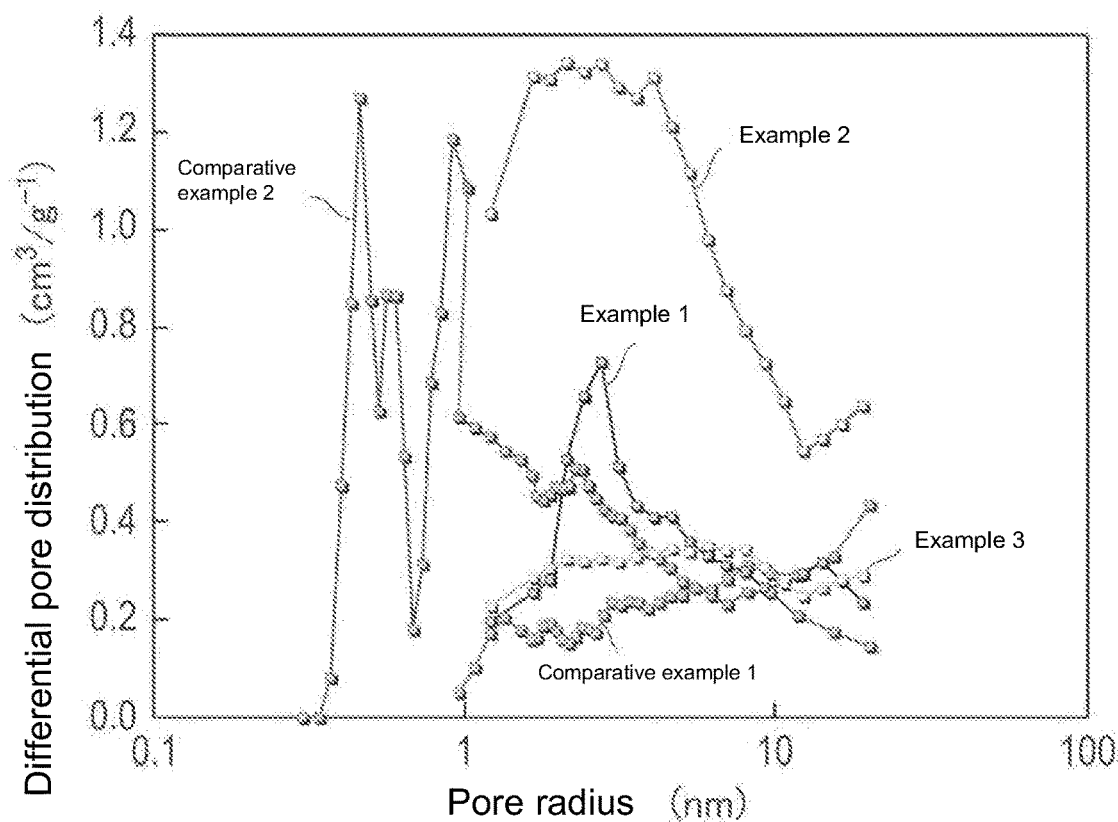
FIG. 5 is a graph showing a result of measuring pore distribution of a porous carrier used in examples and comparative examples by a nitrogen adsorption method.

Carbon black (Ketjen black, EC300J manufactured by Ketjen Black International Co., Ltd., particle diameter: 30 nm, BET specific surface area: 800 m$^2$/g) was prepared as a porous carrier used for a cathode side catalyst layer, and made into the carrier having the pore distribution shown in Table 3 and FIG. 5 by heat-treating under an inert gas atmosphere. Incidentally, the pore distribution of the porous carrier was measured at 77K (temperature of liquid nitrogen) on the basis of a nitrogen adsorption method after the pretreatment of deaeration under reduced pressure at 90° C. for approximately 5 hours by using BELSORP18PLUS-HT manufactured by BEL Japan, Inc. The pore diameter distribution was analyzed by DH method.

Platinum (Pt) with a particle diameter of 2.5 nm as a catalyst was supported on this porous carrier so that the support rate of the catalyst on the porous carrier was 50% by mass to obtain cathode catalyst powder. The catalyst content per unit catalyst coated area was 0.12 mg/cm$^2$.

This cathode catalyst powder and ionomer dispersion liquid (Nafion (registered trademark) D2020, manufactured by Dupont, EW=1000) as a polymer electrolyte were mixed so that the mass ratio between the porous carrier and the ionomer was 1:0.9. In addition, an NPA solution (40% by mass) as a solvent was added so that the solid content (Pt+carbon carrier+ionomer) was 10% by mass to prepare cathode catalyst ink.

The cathode catalyst ink produced as described above was filmily coated by a screen printing method on one side of a solid polymer electrolyte membrane (Nafion (registered trademark) NR211, manufactured by Dupont, EW=1000) as an electrolyte layer. Then, the membrane was dried under an air atmosphere at 130° C. for 15 minutes to thereby form a cathode catalyst layer on the solid polymer electrolyte membrane.

(b) Anode Catalyst Layer

Carbon black (Ketjen black, EC300J manufactured by Ketjen Black International Co., Ltd., particle diameter: 30 nm) was prepared as a porous carrier used for an anode side catalyst layer, and used directly without heat-treating.

Platinum (Pt) with a particle diameter of 2.5 nm as a catalyst was supported on this porous carrier so that the support rate of the catalyst on the porous carrier was 50% by mass to obtain anode catalyst powder. The catalyst content per unit catalyst coated area was 0.05 mg/cm$^2$.

Anode catalyst ink was produced in the same manner as the above except for using this anode catalyst powder instead of the cathode catalyst powder, and filmily coated and dried on the other side of the solid polymer electrolyte membrane to thereby form an anode catalyst layer (thickness: 1.5 μm).

(c) Gas Diffusion Layer

Both faces of the obtained laminated body were sandwiched between gas diffusion layers (24BC, manufactured by SGL Carbon) to produce a membrane electrode assembly.

(2) Production of Cell

Both faces of the membrane electrode assembly produced as described above were sandwiched between carbon separators and gold-plated current collector plates to produce an evaluation single cell.

Examples 2 and 3 and Comparative Example 1

An evaluation single cell was produced in the same manner as the above-mentioned Example 1 except for modifying the heat treatment conditions of the porous carrier of the cathode catalyst layer to make the carrier having the pore distribution shown in Table 3 and FIG. 5.

Comparative Example 2

Carbon black having the pore distribution shown in Table 3 and FIG. 5 (Ketjen black, EC300J manufactured by Ketjen Black International Co., Ltd., particle diameter: 30 nm) was prepared as a porous carrier of the cathode catalyst layer, and used directly without heat-treating. An evaluation single cell was produced in the same manner as the above-mentioned Example 1 except for this fact.

(Cross-Section Observation by SEM)

In Examples 1 and 2, the cross section of the laminated body of the solid polymer electrolyte membrane 2 and the cathode catalyst layer 3c in the lamination direction was observed by a scanning electron microscope (SEM). The obtained SEM photographs are shown in FIGS. 6A and 6B.

Figure 6A:
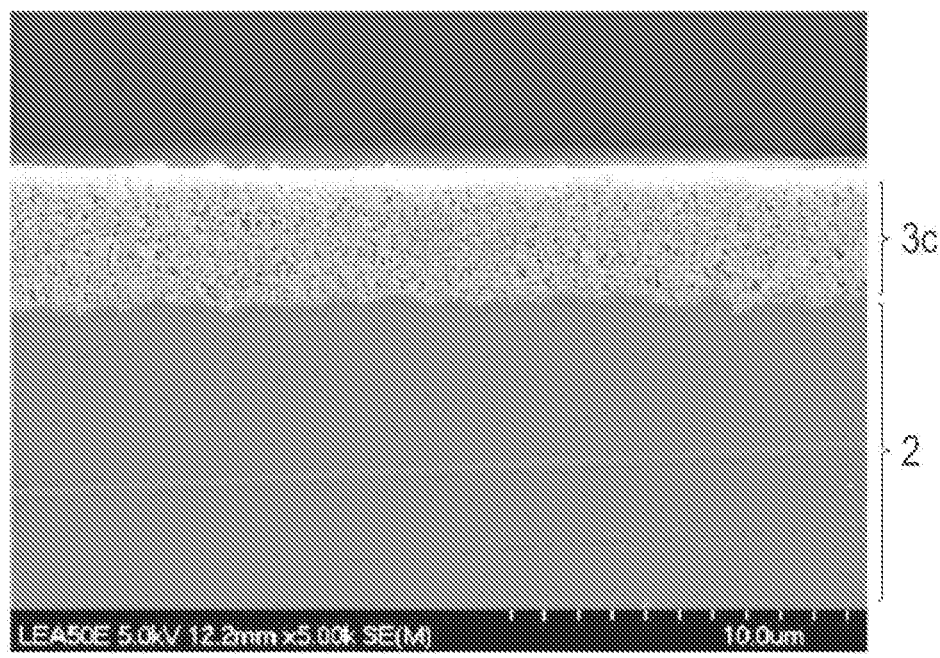
FIG. 6A is a photograph of a cross section of a catalyst layer produced in Example 1, which is observed by SEM.
Figure 6B:
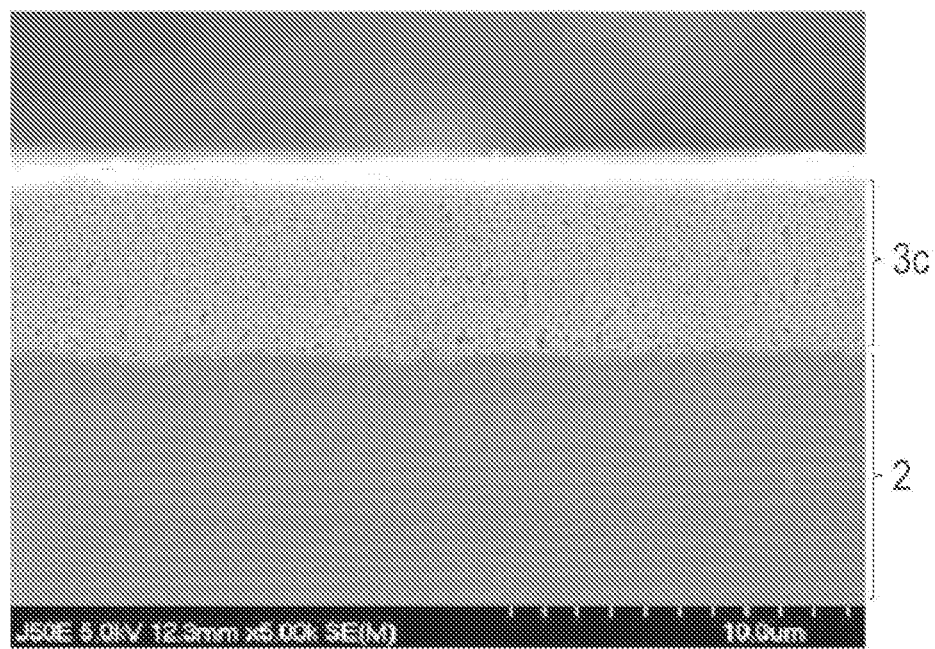
FIG. 6B is a photograph of a cross section of a catalyst layer produced in Example 2, which is observed by SEM.

It is confirmed from a comparison between FIGS. 6A and 6B that bulk density in the catalyst layer of Example 2, in which the pore capacity with a pore diameter of 4 to 20 nm is large, decreases as compared with the catalyst layer of Example 1, so that the thickness of the catalyst layer in the case of using the catalyst of the same amount (a platinum content of 0.12 mg/cm$^2$) increases.

The thickness of the measured cathode catalyst layer of Examples 1 and 2 is shown in Table 3. Also, the thickness of the cathode catalyst layer is measured by the same method in Example 3 and Comparative Examples 1 and 2 to show the result in Table 3.

(Measurement of Pt Effective Surface Area)

With regard to the cathode catalyst layer in Example 1 and Comparative Example 1, electrochemical effective surface area (ECA: Electrochemical surface area) was measured by cyclic voltammetry in the high-humidified state and the low-humidified state to evaluate a relation between relative humidity and Pt effective surface area ratio (a ratio of Pt effective surface area in each relative humidity in the case where Pt effective surface area in a relative humidity of 100% is regarded as 1). The result is shown in FIG. 7.

Figure 7:
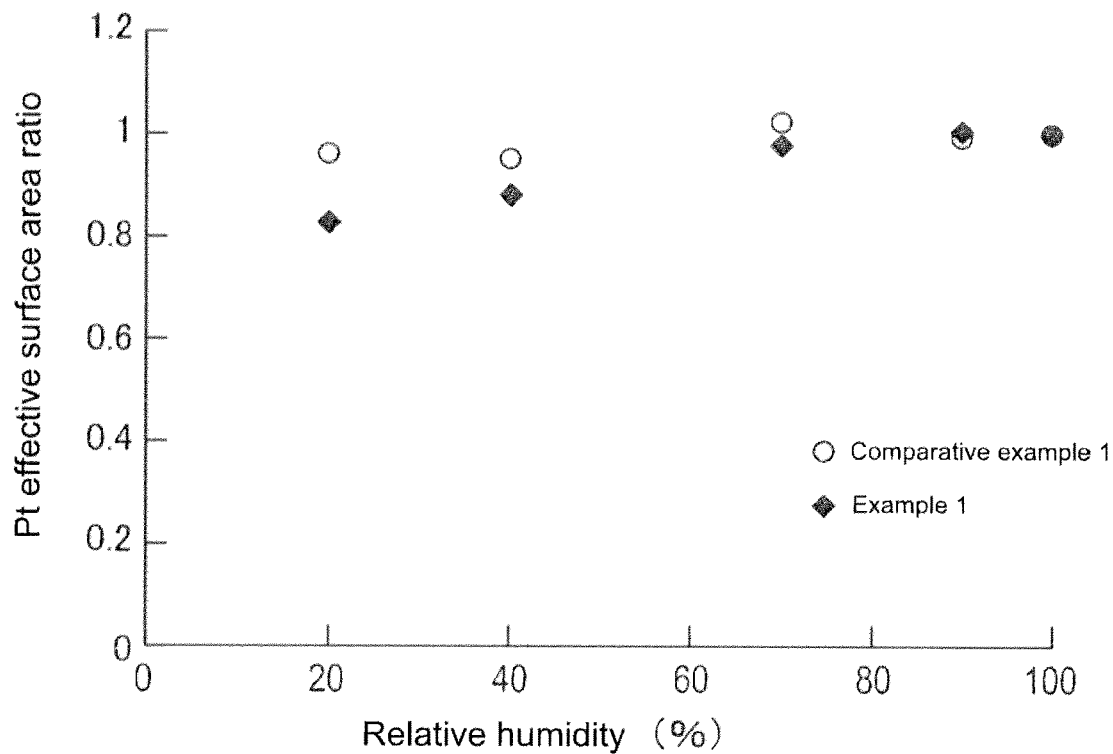
FIG. 7 is a graph showing a relation between relative humidity and Pt effective surface area ratio (ratio of Pt effective surface area in each relative humidity in the case of regarding Pt effective surface area in a relative humidity of 100% as 1) of a catalyst layer produced in Example 1 and Comparative Example 1.

It is found from FIG. 7 that the Pt effective surface area in the catalyst layer of Comparative Example 1 is kept approximately constant even in the case where the relative humidity changes, whereas the Pt effective surface area in the catalyst layer of Example 1 decreases in accordance with a decrease in the relative humidity. This Pt effective surface area signifies the surface area of Pt contacting with electrolyte or water (liquid proton-conducting material). Accordingly, an increase in the Pt effective surface area, which is caused with a rise in the humidity, signifies the presence of Pt contacting with water not electrolyte, namely, the presence of Pt not coated with polymer electrolyte. That is to say, it is suggested from FIG. 7 that Pt not coated with polymer electrolyte exists in the catalyst layer of Example 1, whereas Pt not coated with polymer electrolyte scarcely exists in the catalyst layer of Comparative Example 1.

(Evaluation of Cell Performance)

The evaluation single cell obtained in Examples and Comparative Examples was retained at 80° C. to make dilution air controlled to 90% RH (oxygen of 11%+nitrogen gas of 89%; 15 NL/minute) pass through an oxygen electrode (the cathode) and hydrogen gas controlled to 90% RH (4 NL/minute) pass through a fuel electrode (the anode). Thus, water is introduced into the primary pores of the porous carrier (Ketjen Black), and this water functions as a liquid proton-conducting material. Incidentally, in imitation of the actual operating conditions such that oxygen is consumed to decrease oxygen concentration, the evaluation was performed in dilution air with oxygen concentration thinner than air. Then, the results of evaluating each of the evaluation single cells in the case of determining load current at 0.8 A/cm$^2$ are shown in Table 1 and FIG. 8.

Figure 8:
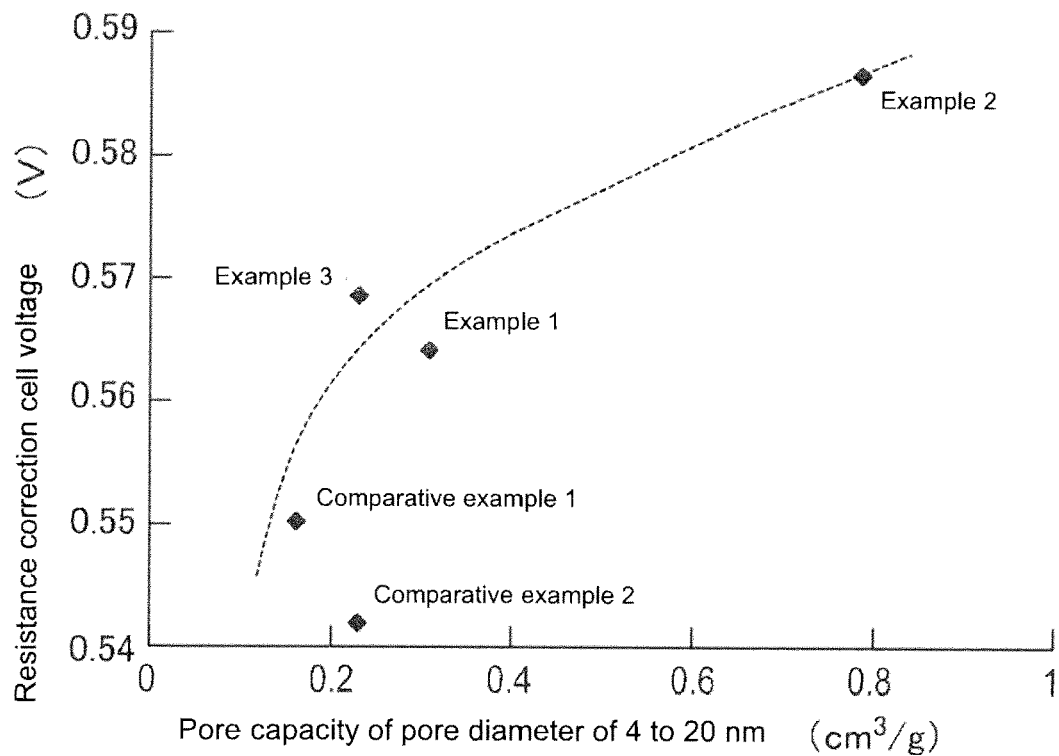
FIG. 8 is a graph showing a result of evaluating each evaluation single cell in the case of determinating load current at 0.8 A/cm$^2$ in an evaluation single cell produced in examples and comparative examples.

It was confirmed from Table 1 and FIG. 8 that Examples 1 to 3, in which a mode diameter of the pore distribution of the porous carrier was 4 to 20 nm, exhibited a high value of cell voltage and excellent power generation characteristics. On the other hand, it was confirmed that Comparative Examples 1 and 2, in which a mode diameter of the pore distribution of the porous carrier was not in a range of 4 to 20 nm, were low in a value of cell voltage and inferior in power generation characteristics.

In addition, it was confirmed from Table 1 and FIG. 8 that Examples 1 to 3 exhibited excellent power generation performance even though the platinum content was as small as 0.20 mg/cm$^2$ or less.

(Measurement of Raman Spectrum)

Raman spectrum of the porous carrier and the catalyst powder used for the above-mentioned Examples and Comparative Examples was measured to calculate the half-value width of G band of the porous carrier and the half-value width of D band of the catalyst powder in which the catalyst was supported on the porous carrier. Microscopic laser Raman SENTERRA manufactured by Bruker Optics K.K. was used for the measurement to determine an excitation wavelength at 532 nm. The result is shown in Table 1.

It is confirmed from Table 1 that the half-value width of D band in the catalyst powder (the porous carrier+the catalyst) of Examples 1 and 3 and Comparative Example 1 is 100 cm$^{-1}$ or less, whereas the half-value width of D band in the catalyst powder (the porous carrier+the catalyst) of Comparative Example 2 exceeds 100 cm$^{-1}$. Also, it is confirmed that the half-value width of G band in the porous carrier of Examples 1 to 3 and Comparative Example 1 is 60 cm$^{-1}$ or less, whereas the half-value width of D band in the porous carrier of Comparative Example 2 exceeds 60 cm$^{-1}$.

TABLE 1

| | Cathode catalyst layer | | | | | |
|---|---|---|---|---|---|---|
| | 4 to 20 nm pore capacity (carbon) (cm$^3$/g) | Pore distribution mode diameter (nm) | G band half-value width only carbon) | D band half-value width (carbon + Pt) | Thickness of catalyst layer using same amount of catalyst (0.12 mg/cm$^2$) (μm) | Resistance correction cell voltage (V) |
| Example 1 | 0.31 | 5.4 | 42 | 92 | 3.7 | 0.564 |
| Example 2 | 0.78 | 4.2 | 60 | — | 5.4 | 0.586 |
| Example 3 | 0.23 | 12 | 55 | 90 | 3.7 | 0.568 |
| Comparative Example 1 | 0.16 | N/A[1)] | 37 | 44 | 3.7 | 0.550 |
| Comparative Example 2 | 0.23 | <2.0 | 68 | 134 | 3.9 | 0.542 |

[1)]Having a mode diameter in a range (>20 nm) including an influence of secondary pores (Durability Test)

Figure 9:
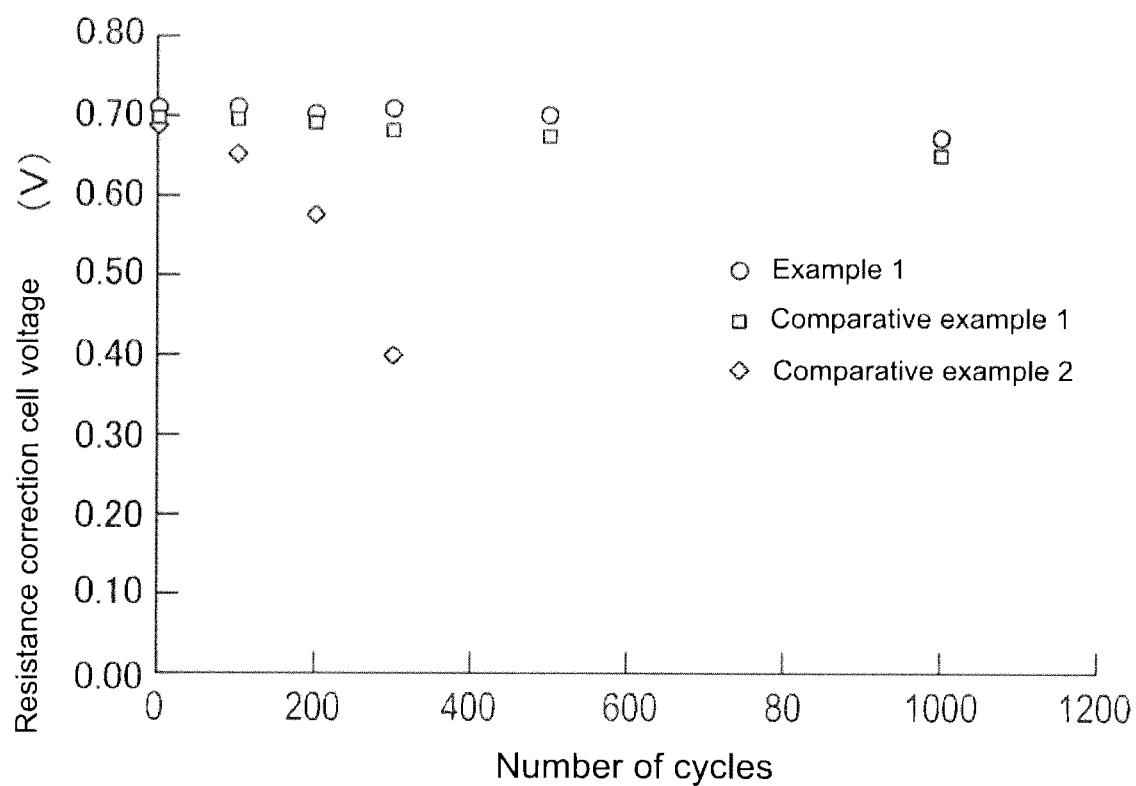
FIG. 9 is a graph showing a result of evaluating cycling characteristics of an evaluation single cell produced in examples and comparative examples.

The durability test was performed for the evaluation single cells obtained in Example 1 and Comparative Examples 1 and 2 under the following conditions. FIG. 9 is such as to plot the value of cell voltage at 1.0 A/cm$^2$ after each cycle.

TABLE 2

| Cycle test conditions |
|---|
| Cell temperature: 80° C. |
| Retaining at an initial electric potential of 1.0 V for 30 seconds |
| Scanning potential range: 1.0 to 1.5 V |
| Scanning rate: 0.5 V/second (2 seconds/one cycle) |
| Number of cycles: 1000 cycles |
| Anode gas: H$_2$ (dew point: 80° C., 100% RH) |
| Cathode gas: N$_2$ (dew point: 80° C., 100% RH) |

It is confirmed from FIG. 9 that the cells of Example 1 and Comparative Example 1, in which the half-value width of D band of the porous carrier is 100 or less, are high in durability, whereas the cell of Comparative Example 2, in which the half-value width of D band of the porous carrier is more than 100, is significantly deteriorated in power generation characteristics with the passage of the cycles and low in durability.

(Measurement of Electric Double Layer Capacity)

With regard to the evaluation single cells of examples obtained in the above-mentioned manner, the electric double layer capacity in each of the high-humidified state and the low-humidified state as well as the high-humidified state and the low-humidified state with the catalyst deactivation was measured by an electrochemical impedance spectroscopy. Incidentally, electrochemical measuring system HZ-3000 manufactured by HOKUTO DENKO CORPORATION and frequency response analyzer FRA5020 manufactured by NF CORPORATION were used as the apparatus to be used.

First, each of the cells was warmed up to 30° C. by a heater to measure the electric double layer capacity while supplying a working electrode and a counter electrode with nitrogen gas and hydrogen gas adjusted to the low-humidified state and the high-humidified state.

Here, on the occasion of measuring the electric double layer capacity, the electric potential of the working electrode was retained at 0.45 V and oscillated at an amplitude of ±10 mV in a frequency range of 20 kHz to 10 mHz. That is to say, the real part and the imaginary part of the impedance at each frequency are obtained from the response of the electric potential of the working electrode during the oscillation. A relation between this imaginary part (Z") and angular velocity co (converted from the frequency) is represented by the following expression, so that the electric double layer capacity $C_{dl}$ is obtained by arranging an inverse number of the imaginary part on minus square of the angular velocity to extrapolate a value when the minus square of the angular velocity is 0.

$$C_{dl} = \frac{1}{\omega Z''} - \frac{1}{\omega^2 R_{ct}^2 C_{dl}}$$ [Expression 1]

Such measurement was sequentially performed in the low-humidified state and the high-humidified state (5% RH→10% RH→90% RH→100% RH conditions).

In addition, the Pt catalyst was deactivated by making nitrogen gas containing CO with a concentration of 1% (volume ratio) pass through the working electrode at 1 NL/minute for 15 minutes or more to thereafter measure the electric double layer capacity similarly in each of the high-humidified state and the low-humidified state as described above. Incidentally, the obtained electric double layer capacity was shown in terms of a value per area of the catalyst layer.

Then, the electric double layer capacity formed at an interface between the catalyst-the solid proton-conducting material (C-S) and an interface between the catalyst-the liquid proton-conducting material (C-L) was calculated on the basis of the measured values. The result is shown in Tables 3 and 4.

TABLE 3

| | Catalyst | Electric double layer capacity (mF/cm²) | | | |
| --- | --- | --- | --- | --- | --- |
| | | 5% RH | 10% RH | 90% RH | 100% RH |
| Example 1 | Activated | 2.34 | 2.53 | 6.19 | 6.26 |
| LEA | Deactivated | 1.16 | 1.32 | 2.82 | 2.80 |
| Example 2 J | Activated | 2.37 | 4.18 | 16.74 | 17.18 |
| | Deactivated | 1.75 | 3.27 | 9.67 | 9.64 |
| Example 3 | Activated | 2.01 | 2.15 | 5.44 | 5.15 |
| LEA-EA | Deactivated | 1.07 | 1.29 | 2.44 | 2.45 |

TABLE 4

| | Electric double layer capacity (mF/cm²) | | |
| --- | --- | --- | --- |
| | C-S interface C-L interface | C-S interface | C-L interface |
| Example 1 | 0.34 | 1.18 | 2.27 |
| Example 2 | 0.12 | 0.90 | 6.64 |
| Example 3 | 0.32 | 0.86 | 1.83 |

As shown in Table 4, it is confirmed in the catalyst layer of Examples 1 to 3 that the electric double layer capacity formed at an interface between the catalyst/the liquid proton-conducting material (C-L interface) is larger than the electric double layer capacity at an interface between the catalyst/the polymer electrolyte (C-S interface).

Although the present invention was described in the above by using examples, the present invention is not limited to only the above-mentioned examples.

Incidentally, in the present specification, "mass" and "weight", "% by mass" and "% by weight", and "part by mass" and "part by weight" are synonyms, and physical properties are measured at room temperature (20 to 25° C.)/relative humidity of 40 to 50% unless otherwise specified.

The present application is based on the Japanese Patent Application No. 2011-251858 filed on Nov. 17, 2011, and the disclosure content thereof is referenced herein and made a part hereof as a whole.

DESCRIPTION OF THE CODES

1 Polymer electrolyte fuel cell (PEFC)
2 Solid polymer electrolyte membrane
3a Anode catalyst layer
3c Cathode catalyst layer
4a Anode gas diffusion layer
4c Cathode gas diffusion layer
5a Anode separator
5c Cathode separator
6a Anode gas passage
6c Cathode gas passage
7 Refrigerant passage
10 Membrane electrode assembly (MEA)
30 Electrode catalyst
31 Catalyst (particles) (Pt)
32 Porous carrier (Carbon carrier)
32a Outer peripheral surface (Surface) of porous carrier
32b Pores (Primary pores)
33 Polymer electrolyte (Ionomer)
34 Pores (Secondary pores)

The invention claimed is:
1. An electrode catalyst layer for a fuel cell consisting essentially of a catalyst, a porous carrier for supporting the catalyst, and a polymer electrolyte, or consisting essentially of a catalyst, a porous carrier for supporting the catalyst, a polymer electrolyte, and liquid proton-conducting material;
  wherein a mode diameter of a pore distribution of the porous carrier measured without the supported catalyst is 4 to 20 nm;
  the catalyst is supported in a pore with a pore diameter of 4 to 20 nm of the porous carrier;
  a pore capacity with a pore diameter of 4 to 20 nm of the porous carrier measured without the supported catalyst is 0.23 to 0.78 cm³/g, and
  the porous carrier is a graphitized carbon carrier.

2. The electrode catalyst layer according to claim 1, wherein the catalyst comprises platinum or platinum-containing alloy.

3. The electrode catalyst layer according to claim 2, wherein a platinum content is 0.20 mg/cm$^2$ or less.

4. The electrode catalyst layer according to claim 1, wherein an average particle diameter of the porous carrier measured without the supported catalyst is 20 to 100 nm.

5. The electrode catalyst layer according to claim 1, further comprising the liquid proton-conducting material capable of connecting the catalyst and the polymer electrolyte in a proton-conductable state between the catalyst and the polymer electrolyte; wherein an electric double layer capacity at an interface between the catalyst/the liquid proton-conducting material, measured in a state such that the liquid proton-conducting material is filled into pores of the porous carrier, is larger than an electric double layer capacity at an interface between the catalyst/the polymer electrolyte.

6. The electrode catalyst layer according to claim 2, wherein a platinum content per unit catalyst coated area of the electrode catalyst layer is 0.20 mg/cm$^2$ or less.

7. The electrode catalyst layer according to claim 1, comprising the polymer electrolyte with an EW of 1000 or less.

8. The electrode catalyst layer according to claim 1, wherein the catalyst supported in the pore with a pore diameter of 4 to 20 nm is not coated with the polymer electrolyte.

9. The electrode catalyst layer according to claim 1, wherein the polymer electrolyte does not intrude into the pores of the porous carrier.

10. A membrane electrode assembly for a fuel cell comprising: a solid polymer electrolyte membrane; a cathode catalyst layer disposed on one side of the solid polymer electrolyte membrane; an anode catalyst layer disposed on the other side of the solid polymer electrolyte membrane; and a pair of gas diffusion layers for sandwiching the solid polymer electrolyte membrane, the anode catalyst layer and the cathode catalyst layer; wherein at least one of the cathode catalyst layer and anode catalyst layer is the electrode catalyst layer according to claim 1.

11. A fuel cell having the membrane electrode assembly according to claim 10.

* * * * *